(12) United States Patent
Morgan, III

(10) Patent No.: US 9,999,849 B2
(45) Date of Patent: *Jun. 19, 2018

(54) DUAL BAG FILTER WITH SPACER

(71) Applicant: Pall Corporation, Port Washington, NY (US)

(72) Inventor: Howard William Morgan, III, Vancouver, WA (US)

(73) Assignee: Pall Corporation, Port Washington, NY (US)

( * ) Notice: Subject to any disclaimer, the term of this patent is extended or adjusted under 35 U.S.C. 154(b) by 109 days.

This patent is subject to a terminal disclaimer.

(21) Appl. No.: 14/569,051

(22) Filed: Dec. 12, 2014

(65) Prior Publication Data

US 2015/0217213 A1    Aug. 6, 2015

Related U.S. Application Data

(60) Provisional application No. 61/935,573, filed on Feb. 4, 2014.

(51) Int. Cl.
*B01D 29/27* (2006.01)
*B01D 29/58* (2006.01)

(52) U.S. Cl.
CPC ............ *B01D 29/27* (2013.01); *B01D 29/58* (2013.01)

(58) Field of Classification Search
None
See application file for complete search history.

(56) References Cited

U.S. PATENT DOCUMENTS

| 2,463,137 | A | | 3/1949 | Bahlke | |
|---|---|---|---|---|---|
| 3,814,261 | A | * | 6/1974 | Morgan, Jr. ........... | B01D 29/23 210/232 |
| 4,015,961 | A | * | 4/1977 | Howard ................. | B01D 46/02 285/189 |
| 4,247,394 | A | * | 1/1981 | Schmidt, Jr. ........... | B01D 29/27 210/232 |
| 4,263,139 | A | | 4/1981 | Erlich | |

(Continued)

FOREIGN PATENT DOCUMENTS

| CN | 202526972 U | 11/2012 |
|---|---|---|
| FR | 2754465 A1 | 4/1998 |

(Continued)

OTHER PUBLICATIONS

Japanese Patent Office, Partial English Translation of Japanese Office Action in counterpart Japanese Application No. P2014-256340, dated Jan. 5, 2016.

(Continued)

*Primary Examiner* — Bobby Ramdhanie
*Assistant Examiner* — Michael J An
(74) *Attorney, Agent, or Firm* — Leydig Voit & Mayer

(57) ABSTRACT

A dual bag filter is provided where a replaceable filter element resides in and is sealed to a filter housing. The filter element has a mounting ring, an inner bag, and an outer bag. The inner bag is sized such that it has more surface area than the outer bag and is constrained by the outer bag. The inner bag is formed from a filter medium of different densities such that when the inner bag is crumpled, fluid flow is not restricted. A perforated central core keeps opposing sides of the inner bag from making contact.

17 Claims, 5 Drawing Sheets

(56) References Cited

U.S. PATENT DOCUMENTS

| | | | | |
|---|---|---|---|---|
| 4,913,815 A | * | 4/1990 | Shulda | B01D 24/08 210/287 |
| 5,075,004 A | | 12/1991 | Gershenson et al. | |
| 5,358,638 A | * | 10/1994 | Gershenson | B01D 29/111 210/448 |
| 5,417,855 A | | 5/1995 | Gershenson | |
| 5,549,826 A | * | 8/1996 | Lapoint, Jr. | B01D 24/042 210/489 |
| 5,643,451 A | * | 7/1997 | Harris | B01D 29/111 210/448 |
| 5,904,743 A | * | 5/1999 | Jensen | B01D 46/02 55/341.1 |
| 6,517,709 B1 | * | 2/2003 | Cardwell | B01D 29/27 210/164 |
| 2006/0086656 A1 | * | 4/2006 | Morgan | B01D 29/27 210/448 |
| 2006/0086674 A1 | | 4/2006 | Morgan | |
| 2015/0008176 A1 | * | 1/2015 | Morgan, III | B01D 29/25 210/450 |

FOREIGN PATENT DOCUMENTS

| | | |
|---|---|---|
| JP | S48-017758 U | 2/1973 |
| JP | 51-136565 U | 11/1976 |
| JP | 52-114376 U | 8/1977 |
| JP | 05-137913 A | 6/1993 |
| JP | 05-254604 A2 | 10/1993 |
| JP | 5-254605 A2 | 10/1993 |
| JP | 2005-138064 A | 6/2005 |
| JP | 2006-116540 A | 5/2006 |
| JP | 3122496 U | 6/2006 |
| KR | 2009-0023822 A | 3/2009 |

OTHER PUBLICATIONS

Japanese Patent Office, Office Action in Counterpart Japanese Patent Application No. P2014-136630, dated Oct. 27, 2015.

* cited by examiner

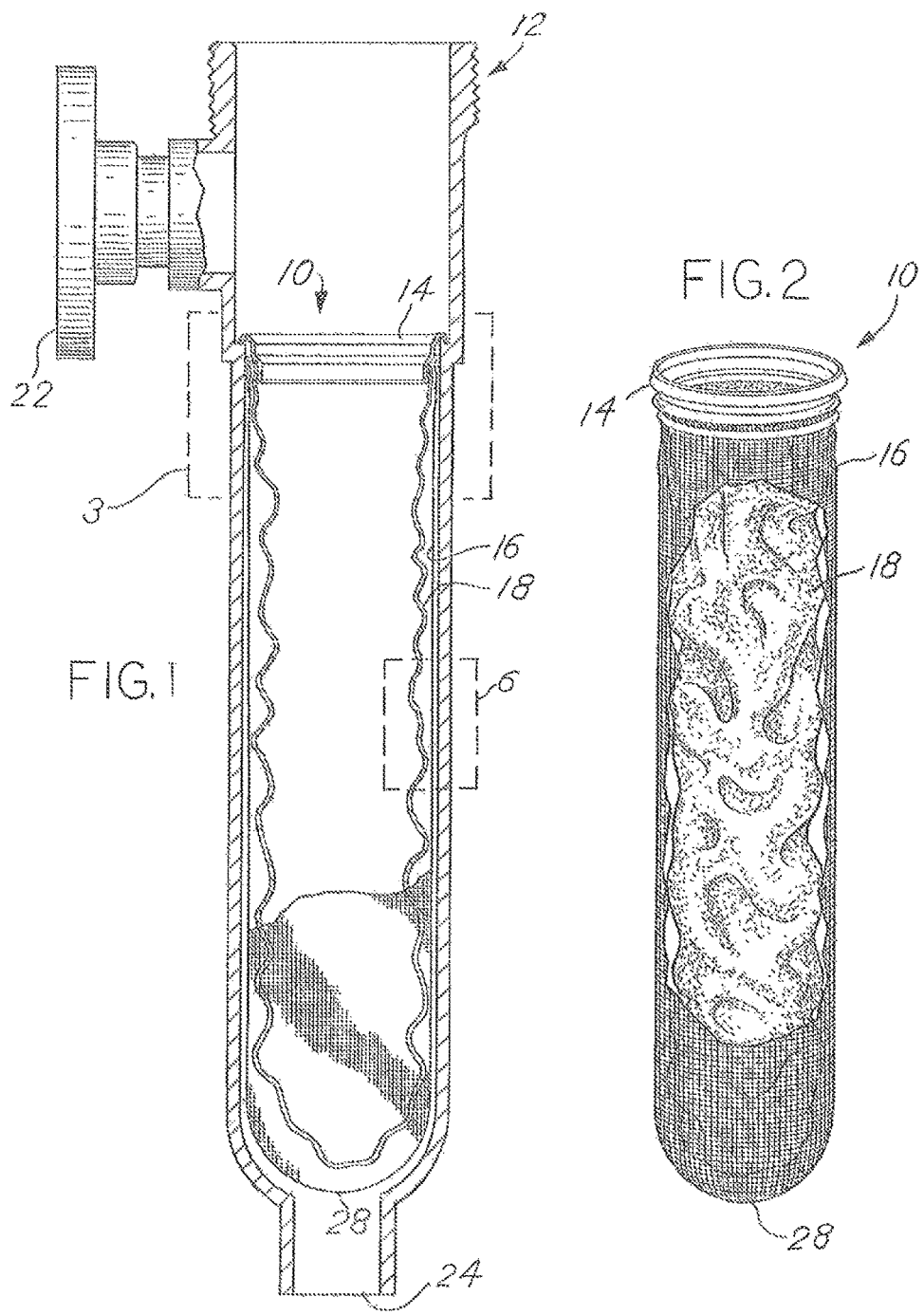

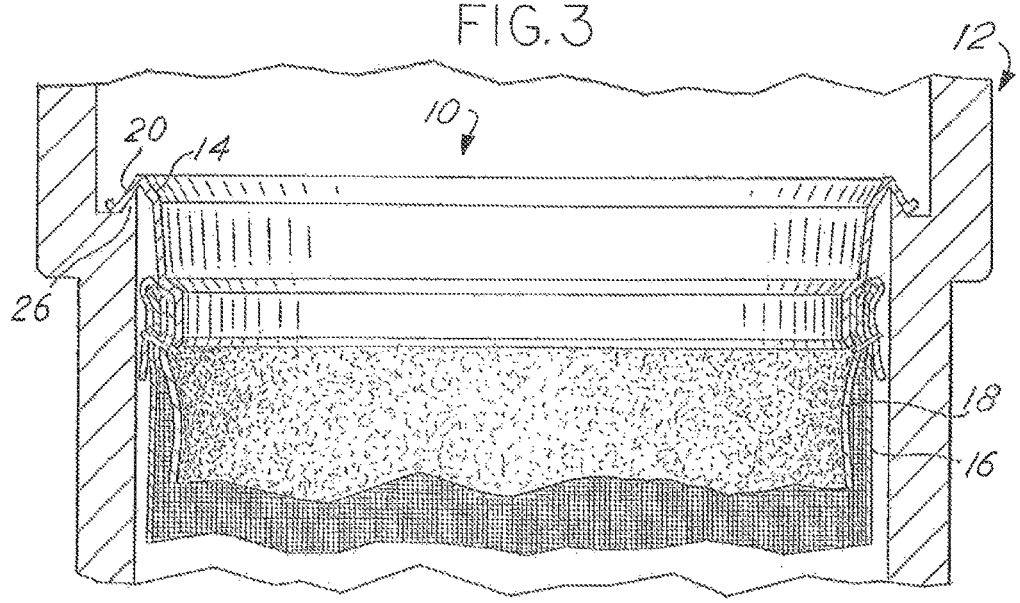
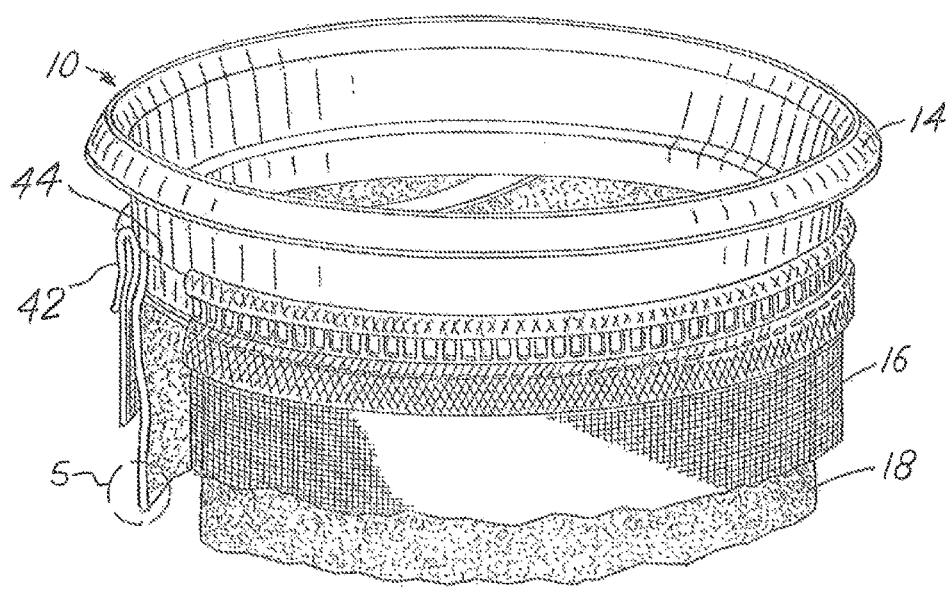

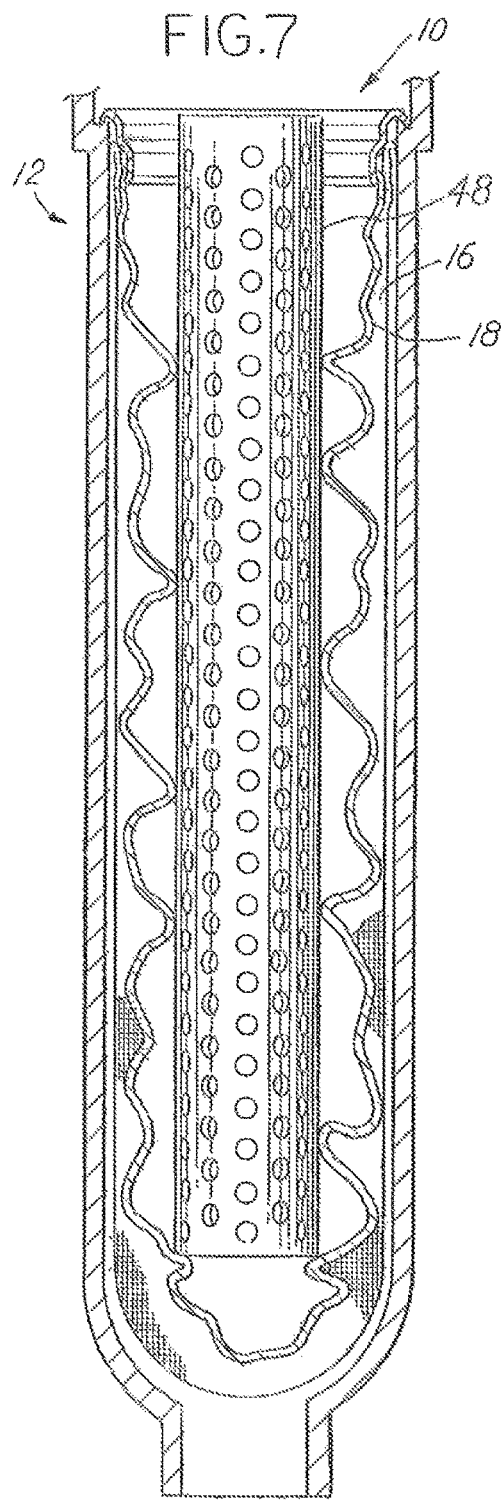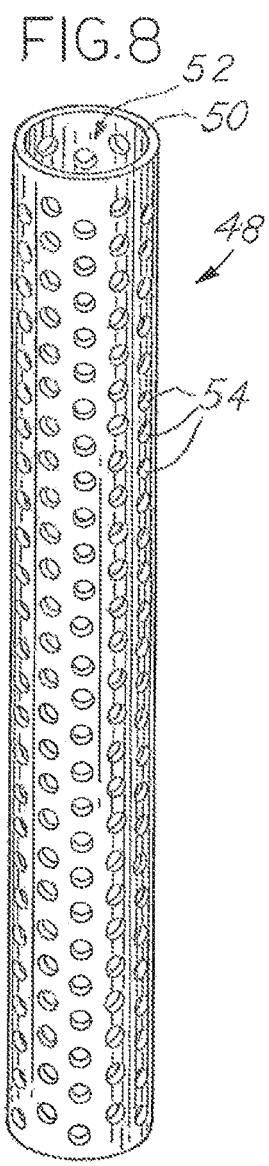

DUAL BAG FILTER WITH SPACER

CROSS-REFERENCE TO RELATED APPLICATION

This application claims the benefit of U.S. Provisional Application No. 61/842,258, filed Jul. 2, 2013 and 61/935,573, filed Feb. 4, 2014, the disclosures of which are hereby incorporated by reference.

BACKGROUND OF THE INVENTION

Large filtering vessels are commonly used for filtering industrial chemicals, such as solvents, cleaning fluids, etc. Such filtering devices are of two different types. One type uses a filtering bag that is suspended within a liner within the filtering vessel. The fluid to be filtered is communicated into the bag, and then communicates through the wall of the bag and the liner to the fluid outlet. Another type of filtering device uses a filtering cartridge mounted within the vessel. The filter cartridge defines an outer circumferential surface which cooperates with the wall of the filtering vessel to define an inlet chamber. The filter cartridge further includes a center core extending coaxially within the cartridge. Fluid to be filtered communicates from the inlet chamber through filtering media found between the outer circumference of the filtering cartridge and the center core, and then communicates through the center core to the outlet of the vessel. In either case, the bag or filter cartridge must be changed periodically, as the contaminants removed from the fluid being filtered are captured within the bag or within the filtering media of the filter cartridge. Accordingly, it is necessary for the filter cartridge to be easily removable and for anew filtering cartridge to be easily installable in the filtering vessel. It is also necessary to maintain a fluid tight seal between the inlet chamber and the outlet from the filtering vessel, on that all of the fluid communicated into the inlet chamber must communicate through the filtering media; it is undesirable that any fluid with entrained contaminants bypasses the filter cartridge and passes directly to the outlet. It is further necessary to have a filter with a large surface area; a large surface area helps to lengthen the time a filter is usable before replacement and increases the filter's allowable flow rate. It is further necessary to produce a low-cost filter.

SUMMARY OF THE INVENTION

The present disclosure describes a filter which is suitable for use in a filter housing. The filter described herein is formed from a felt material. The filter described herein is suitable for use in a variety of filters, such as bag filters, pleated filters, cartridge filters or other filters as are known. The felt material is formed from fibers of varying diameters. The felt material includes three layers which are woven together, a first layer, a second layer, and a third layer. There is a fourth material that constrains the felt material to a maximum size and it is smaller than the felt material. The first layer is formed from fibers having a relatively large diameter. The second layer is formed from fibers having a relatively small diameter. The third layer is formed from fibers having a relatively large diameter. With this configuration, fluid enters the filter through the first layer and exits the filter through the third layer. The first layer serves to filter out large particles and the second layer serves to filter out small particles. The first and third layers serve to provide structure and support to the filter to allow fluid passage and to prevent the second layer from folding over on itself. The fourth material prevents the felt material from expanding beyond the allowable size for use in a filter housing. The felt material is in the shape of a bag and includes an interior. A rigid core is carried in the interior of the felt material. The rigid core is generally tubular in shape. The rigid core is defined by a cylindrical wall which defines an opening at each end and an interior fluid pathway. Fluid entering the filter enters through one of the openings in the ends of the rigid core, and then passes out of the rigid core through one or more apertures formed through the cylindrical wall. The fluid exiting the apertures formed through the cylindrical wall is next filtered by the felt material before exiting the filter housing. The rigid core helps to prevent the felt material from collapsing on itself. The rigid core provides a fluid pathway along the height of the filter. The rigid core aids in inserting the filter in the filter housing.

BRIEF DESCRIPTION OF THE DRAWINGS

FIG. 1 is a cross-sectional side view of a filter canister and filter bag;
FIG. 2 is a perspective view of the filter bag of FIG. 1 cut away to show the inner bag;
FIG. 3 is a close-up view of the portion of the filter bag and housing marked 3 in FIG. 1;
FIG. 4 is a perspective view of the filter bag of FIG. 2;
FIG. 7 is a cross-sectional side view of the filter housing and filter bag of FIG. 1 and also including a core;
and
FIG. 8 is a perspective view of the core of FIG. 7.

DESCRIPTION OF THE PREFERRED EMBODIMENT

Figure 5:
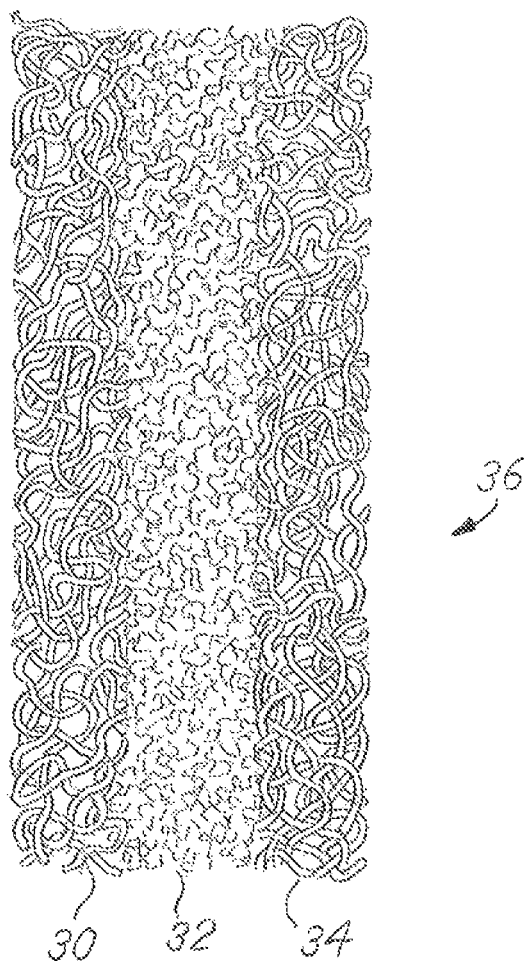
FIG. 5 is a close up view of the fiber structure marked 5 in FIG. 4.

In reference to the several FIGS, elements which are common among the FIGS are referenced by the same ordinal. Any directional references herein, such as above, below, up, down, or similar terminology, are in reference to the spatial relationship of the elements as shown in a given FIG. It is appreciated that the elements described herein could be used in any number of spatial orientations, and as such any directional references herein are merely to aid in the description provided herein and do not limit use.

The present disclosure describes an improved filter element 10. The filter element 10 is suitable for being used in combination with a housing 12. In one instance, the filter element 10 is a bag-type filter, in other instances the filter element 10 is a cartridge filter or a pleated filter. The filter element 10 is suitable for filtering fluids. Generally speaking, the filter functions by filtering solids from a fluid.

Referring to FIGS. 1-4, the filter is formed having a mounting ring 14, an outer bag 16 and an inner bag 18, the specific details of which are described in greater detail below. The housing 12 includes a lid (not shown) which is removable to allow the filter element 10 to be inserted or removed from the housing 12. The housing 12 also includes an inlet 22 and an outlet 24, whereby the fluid to be filtered enters the housing 12 through the inlet 22, subsequently passes through the filter element 10, and then exits the housing 12 through the outlet 24.

The housing 12 includes a shoulder 26 as shown in FIG. 3 at which the mounting ring 14 is mounted. The mounting ring 14 includes a flange portion 20 and an attachment portion 44. The flange portion 20 forms a fluid-tight seal with the shoulder 26 such that any fluid entering the housing 12 must pass through the filter element 10. The flange portion 20 is formed from a flexible material which flexes when inserted against the shoulder 26 such that a tight seal is formed between the mounting ring 14 and the housing 12. The attachment portion 44 is on the outside of the mounting ring 14 as is shown in FIG. 4, but can be located anywhere on the mounting ring 14. The mounting ring 14 has sufficient structure and rigidity to maintain its shape during use. The mounting ring 14 serves as an opening through which fluid enters the filter element 10. Filter housings typically have a round cross-section, and the housing illustrated herein is shown having as such. The mounting ring 14 is shaped to mate with the shoulder 26, and as such the mounting ring 14 is shown as circular, as viewed from the top of the filter. It is appreciated that the filter element 10 and the associated mounting ring 14 described herein could be of any cross-sectional shape that is suitable for mating with the corresponding housing 12.

The opening of the outer bag is joined to the mounting ring 14 at the attachment portion 44 and extends downwardly therefrom to a closed end 28. The closed end 28 is positioned at the bottom end of the housing in proximity of the outlet 24 as shown in FIG. 1. The outer bag 16 is preferably formed from a mesh-like or screen-like material, such as nylon, wherein the outer bag 16 is formed from fibers which define openings through which the fluid may pass. The size of the openings is chosen depending on the type of fluid being filtered. The outer bag 16 is structured to allow fluid to pass and resist stretching from any pressure generated by an inner bag 18 as fluid flows from the inlet 22 to the outlet 24 in the filter housing 12. The primary purpose of the outer bag 16 is to constrain the larger inner bag 18 in a particular shape, as described below.

The opening of the inner bag is joined to the mounting ring 14. The inner bag 18 is carried within the outer bag 16. The inner bag 18 is sized larger than the outer bag 16, such that when the inner bag 18 is in the outer bag 16, the inner bag 18 is folded, creased, and otherwise randomly situated within the outer bag 16 such that the inner bag 18 has a crumpled appearance. The inner bag shape is such that it is longer than the outer bag 16. The outer bag 16 has a diameter that is sized to fit inside of filter housing 12 without making excessive contact with an inside wall of the housing 12. The fitment of the outer bag 16 to the housing 12 is demonstrated in FIG. 1. The inner bag 18 is of a similar diameter or smaller than the outer bag 16. The inner bag is significantly longer than the inner bag, but is constrained by the outer bag 16. Gravity and the nature of fluid flow through the filter element 10 naturally situate the crumples and folds of the inner bag 18 towards the closed end 28 of the outer bag 16. The distance between the mounting ring 14 and the closed end 28 as shown in FIG. 1 defines the length of the outer bag. If the inner bag 18 was not constrained by the outer bag 16, the distance between the mounting ring 14 and a closed end of the inner bag would extend significantly past the lower portion of the filter housing 12. For simplicity, the extent of the folds and crumples in the inner bag are only shown in FIG. 6. The various folds and creases of the inner bag 18 form a larger surface area than the outer bag 16 provides. The larger surface area of the inner bag 18 allows the filter element 10 to filter a greater amount of fluid before needing replacement, as compared to the use of an inner bag 18 that is of roughly the same size as the outer bag 16.

It may be necessary to include a reinforcing strip 42 where the inner bag 18 and outer bag 16 are joined to the attachment portion 44. The reinforcing strip 42 is folded over the openings of both inner and outer bags. The reinforcing strip 42, inner bag 18, and outer bag 16 are all joined together to the attachment portion 44. The attachment method can be with ultrasonic welding, heat sealing, crimping, epoxy, or other methods that securely attach and seal the inner and outer bag to the attachment portion. Proper attachment and sealing are necessary in order to direct all fluid through the inner bag 18.

The inner bag 18 is preferably formed from a filler material 36 as shown in FIG. 5, commonly felt, or a felt-like material, as is commonly known in the art. More specifically, the inner bag 18 is formed from a non-glazed felt. Non-glazed felts have previously been used only in dry filtering applications since non-glazed felt tends to allow the particulates in the filtered media to cake or buildup on the felt material. When felt is used in liquid filters, the felt is glazed to prevent the filtered media from caking or building up on the surface of the felt. However, it has also been found that glazed felt collapses on itself when folded or creased, which prevents proper filtering. The present disclosure finds that the use of non-glazed felt prevents the inner bag 18 from collapsing on itself, and also allows the inner bag 18 to efficiently drain. As such, the use of a non-glazed felt inner bag 18 provides a filter having improved filtering characteristics at lower costs as compared to previous filters.

Based on the size of the inner bag 18, it may be necessary to include a core 48 as shown in FIG. 8 that resides inside of the inner bag 18. If the inner bag 18 is significantly larger than the outer bag 16, opposite sides of the inner bag may come into contact, preventing unfiltered fluid from reaching the bottommost portion of the inner bag 18. The core 48 is an elongate member with top surface 50 and a hollow portion 52 where unfiltered fluid can enter. In order to maintain the largest surface area, the crumples in the inner bag cannot bridge across the center. The core 48 keeps opposite sides of the inner bag separate. The core includes apertures 54 which allow unfiltered fluid to pass from one side to the other.

Figure 6:
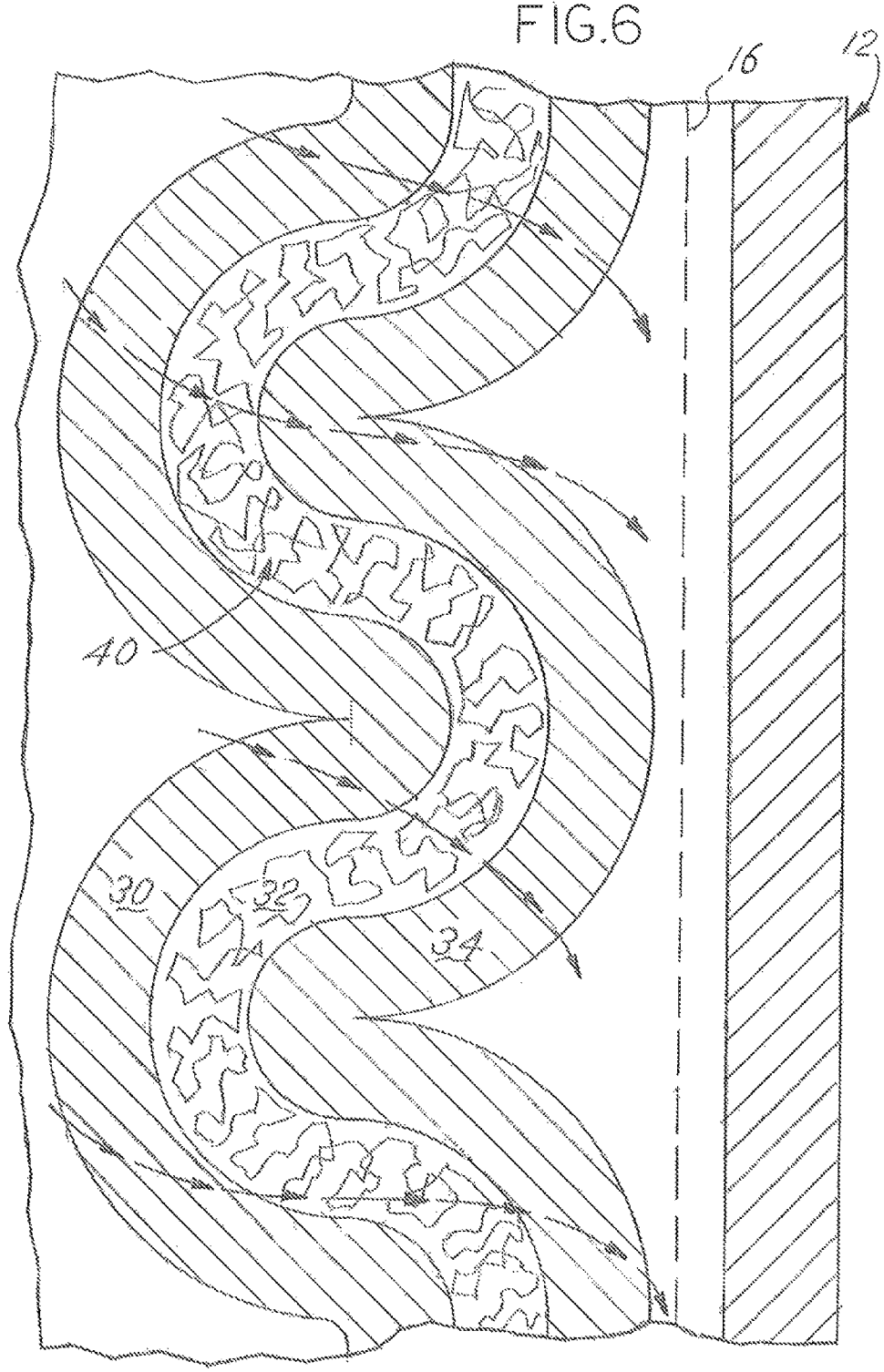
FIG. 6 is a close up view of the inner bag as crumpled marked 6 in FIG. 1.

Referring to FIG. 5, the felt-like material 36 used to construct the inner bag 18 is a three-layer structure: a first layer 30, a second layer 32, and a third layer 34. Each of the three layers 30, 32, and 34 are formed from fibers of a particular diameter. The first layer 30 is formed from fibers having a relatively large diameter, therefore creating a larger pore size filter medium. The second layer 32 is formed from fibers having a relatively small diameter, therefore creating a smaller pore size filter medium. The third layer 34 is formed from fibers having a relatively large diameter, therefore having a larger pore size filter medium. The three materials are bonded together as is shown in FIG. 5. The inner bag 18 has more surface area than the outer bag 16, and therefore has folds and creases as shown in FIG. 6. The primary purpose of the third layer 34 is to maintain a gap between adjacent second layers 40 when the material is folded on itself as shown in FIG. 6. Without the third layer 34, the second layer would fold over on itself, requiring fluid to flow lengthwise through the layer instead of through the thickness. A folded second layer without a gap would render the surface area of the folded over portion useless. Fluid flow through the inner and outer bag is demonstrated in FIG. 6.

In one instance the first layer 30 is wovenly joined to the second layer 32, and the second layer 32 is wovenly joined to the third layer 34. The inner bag material 36 is produced by the following method:

(a) providing a quantity of relatively large diameter fibers;
(b) weaving the large diameter fibers on a needle loom into a first layer of material;
(c) providing a quantity of relatively small diameter fibers distributed over the top surface of the first layer of material;
(d) weaving the small diameter fibers and the first layer of material on a needle loom into a combined first layer and second layer of material;
(e) providing a quantity of relatively large diameter fibers distributed over the top surface of the second layer of material; and
(f) weaving the large diameter fibers and the first and second layers of material on a needle loom into a combined first layer, second layer and third layer of material.

The process of forming the felt-like material 36 results in a material having three layers, where the individual layers are joined to one another by the weaving process, whereby the material 36 forms a single piece of material.

In another instance, each individual layer 30, 32, 34 is manufactured separately, and held in position by the mounting ring 14 as follows:
(a) providing a quantity of relatively large diameter fibers;
(b) weaving the large diameter fibers on a needle loom into a first layer of material;
(c) providing a quantify of relatively small diameter fibers;
(d) weaving the small diameter fibers on a needle loom into a second layer of material;
(e) providing a quantity of relatively large diameter fibers;
(f) weaving the large diameter fibers on a needle loom into a third layer of material; and
(g) joining the first, second, and third layers of material support structure.

This process forms three distinct layers, the first layer, the second layer, and the third layer. The layers are held together in the filter by mechanical joining, such as by crimping the layers together and then to the attachment portion 44 of the mounting ring 14, or by other mechanical joining that would be suitable for forming other filter types. If increased strength is necessary where the bags 16, 18 are secured to the attachment portion 44, a reinforcing strip 42 can be folded over the opening of the bags 16, 18 before they are secured to the attachment portion 44.

The material 36 is suitable for forming a variety of filter types. FIGS. 1-4 illustrate a bag filter which includes an inner bag 18 formed from the material 36. Alternatively, the material 36 is suitable for forming a pleated filter (such as the type of filter used in oil filters).

One benefit of the filter structure shown in FIG. 5 is that when used to filter the fluid may pass through the material 36 from either direction, either starting with the first layer 30 or the third layer 36. In the first instance, the fluid passes through material 36 by first passing through the first layer 30, which first layer filters out the relatively large particles. Next, the fluid passes through the second layer 32, which second layer filters out the relatively small particles. Last, the fluid passes through the third layer 34. In the filter shown in FIG. 2, after leaving the third layer 34, the fluid passes through the outer bag 16. In the second instance, the fluid passes through material 36 by first passing through the third layer 34, which third layer filters out the relatively large particles. Next, the fluid passes through the second layer 32, which second layer filters out the relatively small particles. Last, the fluid passed through the first layer 30. The ability to use the same material 36 to construct filters that either filter fluid from the outside in or from the inside out is a significant improvement over previous filter materials. Typically, bag-type filters filter fluid from the inside of the filter to the outside of the filter, while cartridge-type filters filter fluid from the outside of the filter to the inside of the filter. Here, the same material 36 may be produced and then formed into a shape that is suitable for use with either a bag-type filter or a cartridge-type filter without modifying the structure of the material 36. This flexibility of use with varying types of filters represents a significant improvement over the prior art.

A core 48 is located coaxially to the filter element 10 as is shown in FIG. 7. With an inner bag 18 that is significantly larger than the outer bag 16, an excess amount of folds and crumpled areas can exist in the inner bag 16. With excessive crumpled areas, it is possible that opposing sides of the inner bag 18 will come into contact. By adding a core 48 down the center, it is possible to separate opposing sides of the inner bag from touching. Separating opposing sides of the inner bag 18 allows improved fluid flow through the filter element 10. The core 48 has a plurality of apertures 54 as is shown in FIG. 8 that transmit fluid from the inside of the core to the outside. The core prevents the inner bag 18 crumpled portions on opposite sides of the filter element 10 from touching and therefore closing off fluid passage to the closed end 28 at the bottom. The apertures 54 are along the length of the core and are spaced such that fluid that enters the core can exit at any point along the length as is shown in FIG. 8. Another purpose of the core 48 is to equalize fluid flow along the inside of the inner bag. The core 48 can be as long as the outer bag 16 and has to be rigid enough to keep opposite sides of the inner bag from touching.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:
1. A fluid filter assembly comprising:
a filter housing, said filter housing including:
an inlet for receiving unfiltered fluid comprising particles;
an outlet for discharging fluid, said outlet in fluid communication with said inlet;
a shoulder, located between said inlet and said outlet, said shoulder having a mating surface;
an internal cavity for receiving a filter element;
a filter element, wherein said filter element filters particles from said unfiltered fluid to form said discharging fluid, including:
a mounting ring, having a flange portion and an attachment portion, said attachment portion formed from a substantially rigid material, said flange being flexible and adapted to seal to said mating surface;
an outer bag joined to said mounting ring, said outer bag formed from mesh, said outer bag being smaller than said internal cavity of said filter housing; and
an inner bag joined to said mounting ring and carried within said outer bag, said inner bag having more surface area than said outer bag and being constrained within said outer bag so that said inner bag is randomly crumpled and folded within said outer bag; and
a reinforcing strip folded over the openings, and containing at least a portion of said inner and outer bags;
wherein the reinforcing strip, the outer bag, and the inner bag are attached together to the attachment portion of the mounting ring, and
a rigid core, said rigid core including:
a cylindrical wall defining an open interior;
an aperture passing through said cylindrical wall; and
said rigid core carried within said inner bag; said rigid core substantially coaxial with said filter element.

2. The fluid filter assembly of claim 1, said inner bag having a first layer, a second layer, and a third layer, said first layer formed from a relatively large pore material, said second layer formed from a smaller pore material, said third layer formed from a relatively large pore material.

3. The fluid filter assembly of claim 2, said first layer, said second layer, and said third layer bonded together to form a single unitary member.

4. The fluid filter assembly of claim 3, said inner bag layers formed from unglazed felt.

5. The fluid filter assembly of claim 4, and said first layer is wovenly joined to said second layer and said second layer is wovenly joined to said third layer.

6. The fluid filter assembly of claim 1, said core extending the length of said inner bag.

7. A fluid filter assembly comprising:
a filter housing, said filter housing including:
an inlet for unfiltered fluid comprising particles;
a shoulder, said shoulder having a mating surface;
an internal cavity for receiving a filter element; and
an outlet for discharging fluid; and
a filter element, wherein said filter element filters particles from said unfiltered fluid to form said discharging fluid, including:
a mounting ring, having a flange portion and an attachment portion, said attachment portion formed from a substantially rigid material, said flange being flexible and adapted to seal to said mating surface;
an outer bag formed from mesh, said outer bag having an opening and being smaller than said internal cavity of said filter housing; and inner bag carried within said outer bag, said inner bag having an opening and being larger than said outer bag and randomly crumpled and folded within said outer bag;
said inner bag having a first layer, a second layer, and a third layer, said first layer formed from a relatively large pore material, said second layer formed from a smaller pore material, said third layer from a relatively large pore material; and
a reinforcing strip folded over the openings, and containing at least a portion of said inner and outer bags; wherein the reinforcing strip, the outer bag, and the inner bag are attached together to the attachment portion of the mounting ring, and
a rigid core, said rigid core including:
a cylindrical wall defining an open interior;
an aperture passing through said cylindrical wall; and
said rigid core carried within said inner bag; said rigid core substantially coaxial with said filter element.

8. The fluid filter assembly of claim 7, said first layer, said second layer, and said third layer bonded together to form a single unitary member.

9. The fluid filter assembly of claim 8, said inner bag layers formed from unglazed felt.

10. The fluid filter assembly of claim 9, and said first layer is wovenly joined to said second layer and said second layer is wovenly joined to said third layer.

11. The fluid filter assembly of claim 7, wherein said third layer of said inner bag touches adjacent areas of said third layer of said inner bag.

12. The fluid filter assembly of claim 11, said core extending the length of said inner bag.

13. The fluid filter assembly of claim 7, said core extending the length of said inner bag.

14. A fluid filter element adapted for mounting in a filter housing, said filter housing including an inlet for unfiltered fluid comprising solids, a shoulder having a mating surface, an internal cavity for receiving said filter element, and an outlet for filtered fluid, wherein said filter element filters solid from said unfiltered fluid to form said filtered fluid, said filter element comprising:
a mounting ring, having a flange portion and an attachment portion, said attachment portion formed from a substantially rigid material, said flange being flexible and adapted to seal to said mating surface;
an outer bag formed from mesh, said outer bag having an opening and being smaller than said internal cavity of said filter housing; and
an inner bag carried within said outer bag, said inner bag having an opening and being larger than said outer bag and randomly crumpled and folded within said outer bag ;
said inner bag having a first layer, a second layer, and a third layer, said first layer formed from a relatively large pore material, said second layer formed from a smaller pore material, said third layer from a relatively large pore material; and
a reinforcing strip folded over the openings, and containing at least a portion of said inner and outer bags; wherein the reinforcing strip, the outer bag, and the inner bag are attached together to the attachment portion of the mounting ring, and
a rigid core, said rigid core including:
a cylindrical wall defining an open interior;
an aperture passing through said cylindrical wall; and
said rigid core carried within said inner bag; said rigid core substantially coaxial with said filter element.

15. The fluid filter element of claim 14, wherein said third layer of said inner bag touches adjacent areas of said third layer of said inner bag.

16. The fluid filter element of claim 15, said core extending the length of said inner bag.

17. The fluid filter assembly of claim 2, wherein third layer of said inner bag touches adjacent areas of said third layer of said inner bag.

* * * * *